United States Patent
Matsuura et al.

(10) Patent No.: US 8,968,451 B2
(45) Date of Patent: Mar. 3, 2015

(54) APPARATUS FOR CONCENTRATING A SOLUTION

(75) Inventors: Kazuo Matsuura, Naruto (JP); Ichiko Azuma, Tokushima (JP); Fusatsugu Abe, Naruto (JP)

(73) Assignee: Nanomist Technnologies Co., Ltd., Tokushima (JP)

( * ) Notice: Subject to any disclaimer, the term of this patent is extended or adjusted under 35 U.S.C. 154(b) by 550 days.

(21) Appl. No.: 12/997,074

(22) PCT Filed: Jun. 11, 2009

(86) PCT No.: PCT/JP2009/002657
§ 371 (c)(1),
(2), (4) Date: Feb. 4, 2011

(87) PCT Pub. No.: WO2009/150847
PCT Pub. Date: Dec. 17, 2009

(65) Prior Publication Data
US 2011/0186490 A1      Aug. 4, 2011

(30) Foreign Application Priority Data

Jun. 12, 2008   (JP) .................. 2008-154290

(51) Int. Cl.
*B01D 47/00*    (2006.01)
*B01D 1/18*     (2006.01)
(Continued)

(52) U.S. Cl.
CPC .. *B01D 1/18* (2013.01); *B01D 1/16* (2013.01); *B01D 1/20* (2013.01)
USPC ................ 96/306; 96/311; 96/313; 261/78.2; 261/116

(58) Field of Classification Search
CPC ............... B01D 1/16; B01D 1/18; B01D 1/20
USPC ............. 95/226, 219; 96/276, 278, 279, 280, 96/329, 351, 352, 353, 354, 301, 306, 311, 96/313; 261/119.1, 121.1; 159/3, 4.01, 159/4.07, 48.1, 4.81
See application file for complete search history.

(56) References Cited

U.S. PATENT DOCUMENTS

| 3,895,994 A | 7/1975 | Saguchi et al. |
| 4,358,341 A | 11/1982 | Bergquist |

(Continued)

FOREIGN PATENT DOCUMENTS

| DE | 2148051 | 4/1973 |
| GB | 1204746 | 9/1970 |
| GB | 2 003 042 | 3/1979 |
| JP | 54-45678 | 4/1979 |
| JP | 10-295358 | 11/1998 |
| JP | 2005-131543 | 5/2005 |

OTHER PUBLICATIONS

Cobra Cyclones Centrifugal Filters—How it Works, pdf.*

(Continued)

*Primary Examiner* — Duane Smith
*Assistant Examiner* — Cabrena Holecek
(74) *Attorney, Agent, or Firm* — Wenderoth, Lind & Ponack, LLP (57) ABSTRACT

An apparatus for concentrating solution includes a plurality of nozzles (1) to spray solution into minute particle mist, a gas supplier (2) to transfer gas-mist mixture containing mist by supplying carrier gas to mist sprayed from the nozzle (1), and a separator (3) to separate a component with a low boiling point from a component with a high boiling point by supplying gas-mist mixture transferred using the gas supplier (2). The gas supplier (2) defines a plurality of apertures (9) to supply carrier gas to the plurality of nozzles (1). In this apparatus for concentrating solution, the plurality of nozzles (1) are spraying mist into carrier gas supplied from the apertures (9).

28 Claims, 9 Drawing Sheets (51) Int. Cl.
    *B01D 1/16*     (2006.01)
    *B01D 1/20*     (2006.01)

(56) References Cited

U.S. PATENT DOCUMENTS

| | | | | |
|---|---|---|---|---|
| 4,990,166 | A * | 2/1991 | Babich | 96/235 |
| 5,092,911 | A * | 3/1992 | Williams et al. | 95/117 |
| 5,766,682 | A | 6/1998 | Tsubouchi et al. | |
| 6,235,088 | B1 | 5/2001 | Matsuura | |
| 6,440,594 | B1 * | 8/2002 | Kindler et al. | 429/494 |
| 2003/0007916 | A1 | 1/2003 | Khorzad et al. | |
| 2005/0223890 | A1 * | 10/2005 | Matsuura | 95/29 |
| 2006/0017182 | A1 | 1/2006 | Newman et al. | |
| 2007/0295595 | A1 * | 12/2007 | Matsuura | 204/158.2 |
| 2008/0017560 | A1 * | 1/2008 | Matsuura et al. | 210/151 |

OTHER PUBLICATIONS

Wet Scrubbers, MikroPul, pdf.*

Cobra Cyclones Centrifugal Filters—How it Works, pdf, Dec. 31, 2011.*

Wet Scrubbers, MikroPul, pdf, Mar. 2009.*

International Search Report issued Jul. 21, 2009 in International (PCT) Application No. PCT/JP2009/002657.

Extended European Search Report issued Feb. 18, 2013 in corresponding European Patent Application No. 09762278.1.

Examination Report issued Dec. 4, 2013 in corresponding European patent application No. 09 762 278.1.

* cited by examiner

APPARATUS FOR CONCENTRATING A SOLUTION

BACKGROUND OF THE INVENTION

1. Technical Field

Presented invention is for a separation apparatus of alcohol water solutions etc., particularly, the concentration apparatus to separate from higher boiling point components to lower boiling point components by atomizing solutions into mist.

2. Background Art

An apparatus to concentrate and recycle a washing waste solution used in off-set printing has been developed, refer to Patent Document 1. This apparatus can concentrate the washing solution whereby the apparatus atomizes washing waste solution into mist, and the atomized mist is separated by cyclone. The apparatus can concentrate the washing waste solution to remove ink in washing waste solution, soluble components in ink, and machinery oil of rotary press.

Patent Document 1: JP 2005-131543 A

SUMMARY OF INVENTION

Problem to be Solved by the Invention

Figure 1:
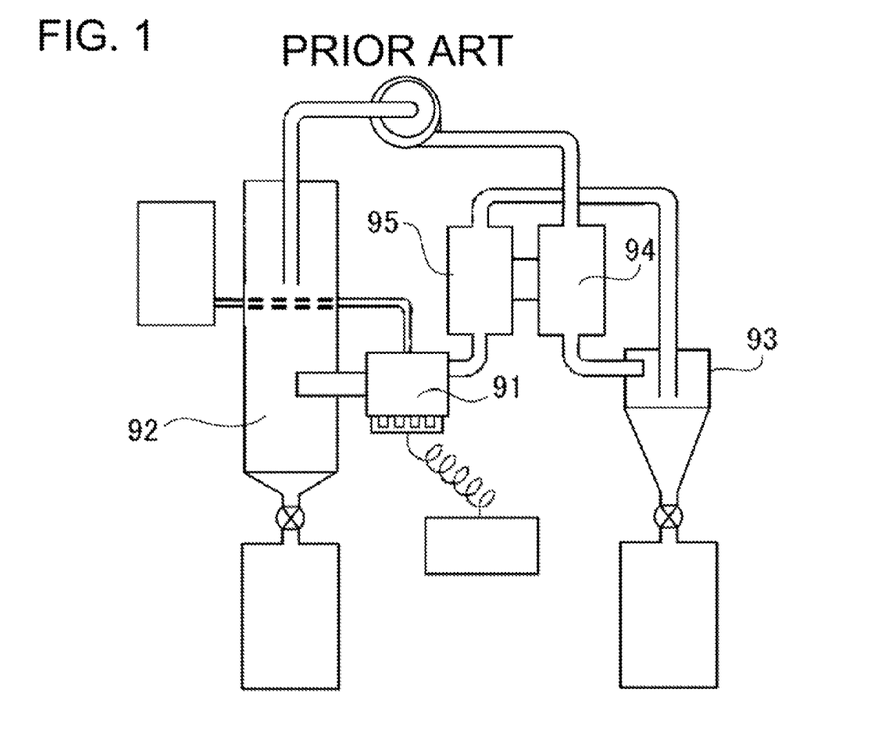

The apparatus disclosed in Patent Document 1 concentrates the washing solution to recycle and separate from washing waste solution to machinery oil etc. As washing solution in off-set printing, solvents consisted from volatile compounds are used. The washing solutions after washing printer are contaminated by ink, soluble components in ink, and dirty components from machinery oil of rotary press. Since these contaminated compounds have a property difficult to vaporize, these compounds are separated by evaporation method. As shown in FIG. 1, the apparatus disclosed in Patent Document 1 atomizes the washing solution as mist into vaporize 92 with a cyclone shape. The solvent consisted of volatile components in the atomized mist is vaporized and discharged from upward outlet of cyclone vaporizer 92. Other ink and machinery oil are discharged from downward of vaporizer 92. The solvent discharged from upward of cyclone vaporizer 92 is cooled at cooling heat exchanger 94 and collected at cyclone condenser 93. The gas discharged from upward of cyclone condenser 93 is heated at heating heat exchanger 95 and recirculated into ultrasonic atomization chamber 91.

Figure 2:
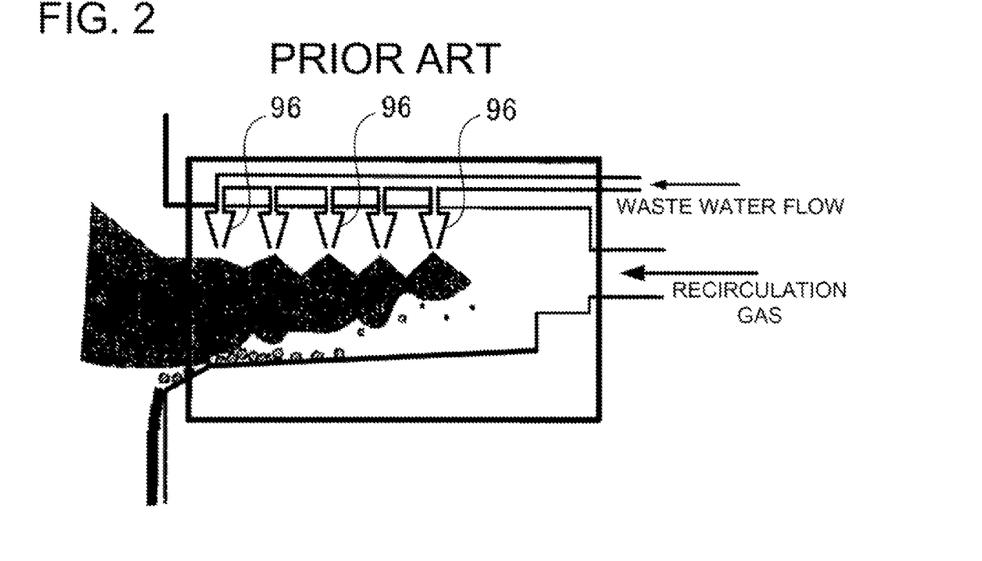

Moreover, the Patent Document 1 also discloses a structure to ultrasonically atomized the washing waste solution into mist and other structure to atomize using spray nozzle 96 as shown in FIG. 2. The atomization apparatus of washing waste solution into mist by ultrasonic vibration has a function easy to separate the solvent from contaminated compounds, because the solvents can be easily atomized into mist in comparison with contaminated compounds like machinery oil. However, the apparatus using ultrasonic vibration has an expensive cost due to need ultrasonic oscillators and the power amplifier. Additionally, there is a week point by the higher running cost due to exchange the ultrasonic oscillators at fixed interval. The apparatus using spray nozzles to atomize the washing waste solution into mist will be reduced the equipment cost and running cost. However, since the nozzles just only atomize the whole washing waste solution into the cyclone vaporizer, the only process of atomization from the nozzle can't separate between solvent and contaminated compounds like machinery oil. Therefore, atomized mist will contains the same concentration of contaminated compounds like machinery oil as the concentration in mist. As mentioned above, there is a week point that nozzle spraying can't efficiently separate the solvent and contaminated compounds at the vaporizer because nozzle spraying just only atomize the whole washing solution into cyclone vaporizer.

The presented invention is developed under purpose to solve the above mentioned week points.

The important aim in presented invention is to present the efficient apparatus for concentrating solutions wherein both equipment cost and running cost will be decreased by simple structure that nozzles spray solution into mist.

Means to Solve the Problem

According to the first aspect of the invention, the apparatus for concentrating solution comprises:

a plurality of nozzles 1 to spray a solution into minute particle mist;

a gas supplier 2 to supply a carrier gas into the sprayed mist and to transfer mist as gas-mist mixture; and a separator 3 to separate low boiling point component from high boiling point component by supplying gas-mist mixture transferred using the gas supplier 2, wherein the gas supplier 2 defines a plurality of apertures 9 to supply the carrier gas into the plurality of nozzles 1, the plurality of nozzles 1 spray mist into the carrier gas supplied from the plurality of apertures 9.

According to the second aspect of the apparatus for concentrating solution, the gas supplier 2 defines a plurality of apertures 9 to supply the carrier gas into each nozzle 1.

According to the third aspect of the apparatus for concentrating solution, the gas supplier 2 comprises a gas pressurizer 6 to compress and flow the carrier gas, and the carrier gas flowed from the gas pressurizer 6 is ejected from the plurality of apertures 9 set around each nozzle 1.

According to the fourth aspect of the apparatus for concentrating solution, the gas supplier 2 defines a plurality of apertures 9 to supply the carrier gas into the plurality of nozzles 1 around the nozzles 1, and further comprises a gas mist mixer 7, 17, 27 to generate gas mist mixture that the plurality of nozzles 1 spray mist into the carrier gas supplied from each aperture 9.

According to the fifth aspect of the apparatus for concentrating solution, the gas mist mixer 7, 17, 27 comprises a chamber plate 8, 18, 28 in inside, the chamber plate 8, 18, 28 separates the gas mist mixer 7, 17, 27 to an inlet side and an outlet side, the plurality of nozzles 1 are fixed on the chamber plate 8, 18, 28 as spraying mist toward outlet side.

According to the sixth aspect of the apparatus for concentrating solution, the chamber plate 8, 18, 28 defines the aperture 9 as penetrated holes to supply the carrier gas to nozzle 1 around each nozzle 1.

According to the seventh aspect of the apparatus for concentrating solution, each nozzle 1 defines each aperture 9.

According to the eighth aspect of the apparatus for concentrating solution, the plurality of apertures 9 are defined around the nozzle 1.

According to the ninth aspect of the apparatus for concentrating solution, the gas mist mixer 17 comprises the chamber plate 18 two-dimensionally fixed the plurality of nozzles 1 and opened the plurality of apertures 9 around each nozzle 1.

According to the tenth aspect of the apparatus for concentrating solution, an aperture 9 is set between adjacent nozzles 1.

According to the eleventh aspect of the apparatus for concentrating solution, it comprises:
a plurality of nozzles 1 to spray a solution into minute particle mist;
a gas supplier 2 to supply a carrier gas into the sprayed mist and to transfer mist as gas-mist mixture; and
a separator 3 to separate low boiling point component from high boiling point component by supplying gas-mist mixture transferred using the gas supplier 2.
The gas supplier 2 defines a plurality of apertures 39 with slit shape to supply the carrier gas into the plurality of nozzles 1, the plurality of nozzles 1 spray mist into the carrier gas supplied from the plurality of apertures 39 with slit shape.

According to the twelfth aspect of the apparatus for concentrating solution, an aperture 39 is set between adjacent nozzles 1.

According to the thirteenth aspect of the apparatus for concentrating solution, the gas supplier 2 comprises gas mist mixer 37 for gas mist mixture that the plurality of nozzles 1 spray mist into the carrier gas supplied from the aperture 9, the gas mist mixer 37 comprises a chamber plate 38 in inside, the chamber plate 38 separates the gas mist mixer 37 to an inlet side and an outlet side, the plurality of nozzles 1 are fixed on the chamber plate 38 as spraying mist toward outlet side, and the gas mist mixer 37 comprises the chamber plate 38 fixed the plurality of nozzles 1 and opened aperture 39 with slit shape.

According to the fourteenth aspect of the apparatus for concentrating solution, one or plural line(s) apertures 39 with slit shape is/are set between adjacent nozzles 1.

According to the fifteenth aspect of the invention, the apparatus for concentrating solution, comprises:
a plurality of nozzles 1 to spray a solution into minute particle mist;
a gas supplier 2 to supply a carrier gas into the sprayed mist and to transfer mist as gas-mist mixture; and
a separator 3 to separate low boiling point component from high boiling point component by supplying gas-mist mixture transferred using the gas supplier 2.
The nozzle 1 is two fluid nozzle 41 to spray both the solution and the carrier gas, the gas supplier 2 supplies the carrier gas to the two fluid nozzle 41, and the nozzle 1 sprays gas mist mixture.

According to the sixteenth aspect of the apparatus for concentrating solution, the two fluid nozzle 41 sprays solution supplied from pump 4 into mist by the carrier gas supplied from gas pressurizer 6.

According to the seventeenth aspect of the apparatus for concentrating solution, the two fluid nozzle 41 sprays uncompressed solution into mist by the carrier gas.

According to the eighteenth aspect of the apparatus for concentrating solution, the separator 3 is cyclone 30, and concentrating low boiling point component containing in the carrier gas ejected from upward outlet 33 of the cyclone 30.

According to the nineteenth aspect of the apparatus for concentrating solution, the separator 3 is demister 40, and concentrating low boiling point component containing in the carrier gas.

According to the twentieth aspect of the apparatus for concentrating solution, cooling and spraying the solution sprayed from the nozzles 1.

According to the 21st aspect of the apparatus for concentrating solution, heating the carrier gas by thermal energy to cool the solution sprayed from the nozzles 1.

According to the 22nd aspect of the apparatus for concentrating solution, concentrated solution is one of alcohol water solution, anti-freezing solution, or petroleum.

According to the 23rd aspect of the apparatus for concentrating solution, the carrier gas containing one of hydrogen, argon, or methane.

According to the 24th aspect of the apparatus for concentrating solution, the solution is anti-freezing solution containing with water and freezing point depressant, concentrating the anti-freezing solution whereby first component ejected from upward outlet of cyclone 30 is put into water bulk with bubble to remove freezing point depressant from carrier gas and ejected, and second component evacuated from downward outlet of cyclone 30 is recirculated into solution spraying from the nozzle 1.

According to the 25th aspect of the apparatus for concentrating solution, the solution is alcohol water solution, first component ejected from upward outlet of cyclone 30 is coagulated, separated and collected the concentrated alcohol.

Effect of the Invention

The presented invention discloses properties that the apparatus for concentrating solution can decrease both the equipment cost and running cost according to spray solution by nozzle without using ultrasonic vibration, and the apparatus can efficiently separate and concentrate solution. The reason why nozzles spraying into mist can efficiently separate and concentrate solution is because necessary carrier gas can be efficiently supply to mist sprayed from the plurality of nozzles. In the apparatus defined in the first aspect, the plurality of nozzles have corresponding plural apertures to supply carrier gas, the plurality of nozzles are spraying mist into carrier gas supplied from plural apertures. In apparatus defined in the eleventh aspect, every nozzle accompany corresponding slit aperture supplying carrier gas, the plurality of nozzles are spraying mist into carrier gas supplied from each slit apertures. Moreover, in apparatus defined in the fifteenth aspect, by using two fluid nozzle spraying both solution and carrier gas, the nozzle can spray mist-gas mixture flow by supplied carrier gas into two fluid nozzle from gas supplier.

Apparatus for concentrating solution mentioned above can supply the carrier gas into mist sprayed from each nozzle. Therefore, components with lower boiling point in mist sprayed from the nozzle can be efficiently vaporized into simultaneously supplying carrier gas. Apparatus for concentrating solution to separate low boiling point components and high boiling point component from solution using spry atomization of nozzle is utilizing the deference of relative volatility between low boiling point components and high boiling point component. For example, when alcohol-water solution that alcohol with lower boiling point is solved in water with higher boiling point is atomized into mist, low boiling point's alcohol containing in mist is faster atomized into carrier gas from mist surface than high boiling point's water, water, is easier remaining in mist solution side that alcohol, so alcohol is separable from water by separating carrier gas containing alcohol from remaining solution mist.

As shown in FIG. 2, conventional apparatus is spraying solution into mist from plural nozzle 96 and carrier gas is supplied from on the way of duct after mist is sprayed. This structure can't efficiently evaporate low boiling point components into the supplied carrier gas. Because the supplied carrier gas is immediately saturated by vaporization from the sprayed mist surface in upper stream of carrier gas, therefore in the lower stream of carrier gas, the low boiling point components can't be vaporized from mist surface or spray nozzles. Corresponding to this problem structure, in apparatus in the presented invention, the carrier gas is equally supplied towards every nozzle from each plural aperture, equally supplied from every slit aperture, or equally supplied towards atomization fields from two-fluid nozzle. Thereby the carrier gas is evenly supplied into atomized mist, the limitation of vaporization and atomization by biased saturation of low boiling point component into carrier gas is canceled. Therefore, apparatus in this invention can be efficiently separate low boiling point component from high boiling point component whereby the low boiling point component in atomized mist is efficiently vaporized into carrier gas. Therefore, apparatus for concentrating solution in this invention has properties that low boiling point component is efficiently separated from high boiling point component while the carrier gas supplying method toward equally every nozzle is simply realized, and the equipment cost is reduced without using ultrasonic vibration. Moreover, the running cost in presented apparatus is remarkably reduced because of no use of ultrasonic oscillators and no exchange of the oscillators.

BRIEF DESCRIPTION OF THE DRAWINGS

FIG. 1 shows a schematic view of conventional apparatus for concentrating solution;

FIG. 2 shows a cross sectional view of a status that conventional apparatus for concentrating solution is spraying solution from plural nozzles;

FIG. 3 shows a schematic view of apparatus for concentrating solution in concerning with an example of carrying out of presented invention;

FIG. 4 shows a schematic view of apparatus for concentrating solution in concerning with other example of carrying out of presented invention;

FIG. 5 shows a schematic view of apparatus for concentrating solution in concerning with other example of carrying out of presented invention;

FIG. 6 shows a schematic view of apparatus for concentrating solution in concerning with other example of carrying out of presented invention;

FIG. 7 shows a perspective view of a structure that plural nozzles are spraying mist of solution into carrier gas;

FIG. 8 shows a view of an example of assignment of plural nozzles and plural apertures;

FIG. 9 shows a view of other example of assignment of plural nozzles and apertures;

FIG. 10 shows a view of other example of assignment of plural nozzles and plural apertures;

FIG. 11 shows a view of an example of assignment of plural nozzles and slit apertures;

FIG. 12 shows a cross schematic sectional view of an example of two fluid nozzle; and FIG. 13 shows a graph showing a relationship between flow rate of mist-gas mixture and alcohol concentration in exhaust gas Corresponding to temperatures in alcohol solution.

DETAILED DESCRIPTION OF THE INVENTION

We will explain modes for carrying out in this invention based on drawings. It should be noted that the modes for carrying out as follows are persistently in just only for examples to explain the realization of this invention thought for apparatus for concentrating solution, the presented invention is not restricted under the following examples.

Moreover, this disclosure is numbering to elements shown in this embodiment for understandings of the invention claims, the reference numerals are indicated with the elements in figures and embodiment. It should be noted that the elements defined on the claims are not restricted by the elements in the embodiment.

Apparatus in presented invention concentrates solution by separating a part of components from solution containing plural components that have various boiling point or physic chemical properties. Examples of the solutions are as follows. The following solutions are aqueous solution, solutes in solvents except for water, or mixtures of plural liquids.

(1) Bio mass alcohol, refined sake, beer, wine, vinegar, mirin (sweet sake for cooking), spirits, shochu (Japanese spirits), brandy, whisky and liqueur.

(2) Solutions containing a perfume such as pinene, linalool, limonene, or polyphenols, an aromatic component, or a fragrant component.

(3) Petroleum (4) Solutions containing an organic compound that is classified as any one of alkane and cycloalkane, which are a saturated hydrocarbon, alkene, cycloalkene, and alkyne, which are an unsaturated hydrocarbon, ether, thioether, and aromatic hydrocarbon, or a compound obtained by bonding these.

(5) Solution containing a substance obtained by substituting a halogen(s) for at least one hydrogen atom or functional group of an organic compound that is classified as any one of alkane and cycloalkane, which are a saturated hydrocarbon, alkene, cycloalkene and alkyne, which are an unsaturated hydrocarbon, ether, thioether, and aromatic hydrocarbon, or a bonded compound of these.

(6) Solution containing a substance obtained by substituting a hydroxy group(s) for at least one hydrogen atom or functional group of an organic compound that is classified as any one of alkane and cycloalkane, which are a saturated hydrocarbon, alkene, cycloalkene and alkyne, which are an unsaturated hydrocarbon, ether, thioether, and aromatic hydrocarbon, or a bonded compound of these.

(7) Solution containing a substance obtained by substituting an amino group(s) for at least one hydrogen atom or functional group of an organic compound that is classified as any one of alkane and cycloalkane, which are a saturated hydrocarbon, alkene, cycloalkene and alkyne, which are an unsaturated hydrocarbon, ether, thioether, and aromatic hydrocarbon, or a bonded compound of these.

(8) Solution containing a substance obtained by substituting a carbonyl group(s) for at least one hydrogen atom or functional group of an organic compound that is classified as any one of alkane and cycloalkane, which are a saturated hydrocarbon, alkene, cycloalkene and alkyne, which are an unsaturated hydrocarbon, ether, thioether, and aromatic hydrocarbon, or a bonded compound of these.

(9) Solution containing a substance obtained by substituting a carboxyl group(s) for at least one hydrogen atom or functional group of an organic compound that is classified as any one of alkane and cycloalkane, which are a saturated hydrocarbon, alkene, cycloalkene and alkyne, which are an unsaturated hydrocarbon, ether, thioether, and aromatic hydrocarbon, or a bonded compound of these.

(10) Solution containing a substance obtained by substituting a nitro group(s) for at least one hydrogen atom or functional group of an organic compound that is classified as any one of alkane and cycloalkane, which are a saturated hydrocarbon, alkene, cycloalkene and alkyne, which are an unsaturated hydrocarbon, ether, thioether, and aromatic hydrocarbon, or a bonded compound of these.

(11) Solution containing a substance obtained by substituting a cyano group(s) for at least one hydrogen atom or functional group of an organic compound that is classified as any one of alkane and cycloalkane, which are a saturated hydrocarbon, alkene, cycloalkene and alkyne, which are an unsaturated hydrocarbon, ether, thioether, and aromatic hydrocarbon, or a bonded compound of these.

(12) Solution containing a substance obtained by substituting a mercapto group(s) for at least one hydrogen atom or functional group of an organic compound that is classified as any one of alkane and cycloalkane, which are a saturated hydrocarbon, alkene, cycloalkene and alkyne, which are an unsaturated hydrocarbon, ether, thioether, and aromatic hydrocarbon, or a bonded compound of these.

(13) Solutions containing a substance obtained by substituting a metal ion(s) for at least one atom of the target substances mentioned in (4) to (12).

(14) Solutions containing a substance obtained by substituting an arbitrary molecule(s) of the molecules mentioned in (4) to (12) for an arbitrary hydrogen atom(s), carbon atom(s), or functional group(s) contained in the target substances mentioned in (4) to (12).

(15) Coolant containing glycol.

(16) Aqueous solution of ammonia.

(17) Aqueous solution of inorganic acids.

(18) Aqueous solution of organic acids.

(19) Aqueous solution of alkali.

Figure 3:
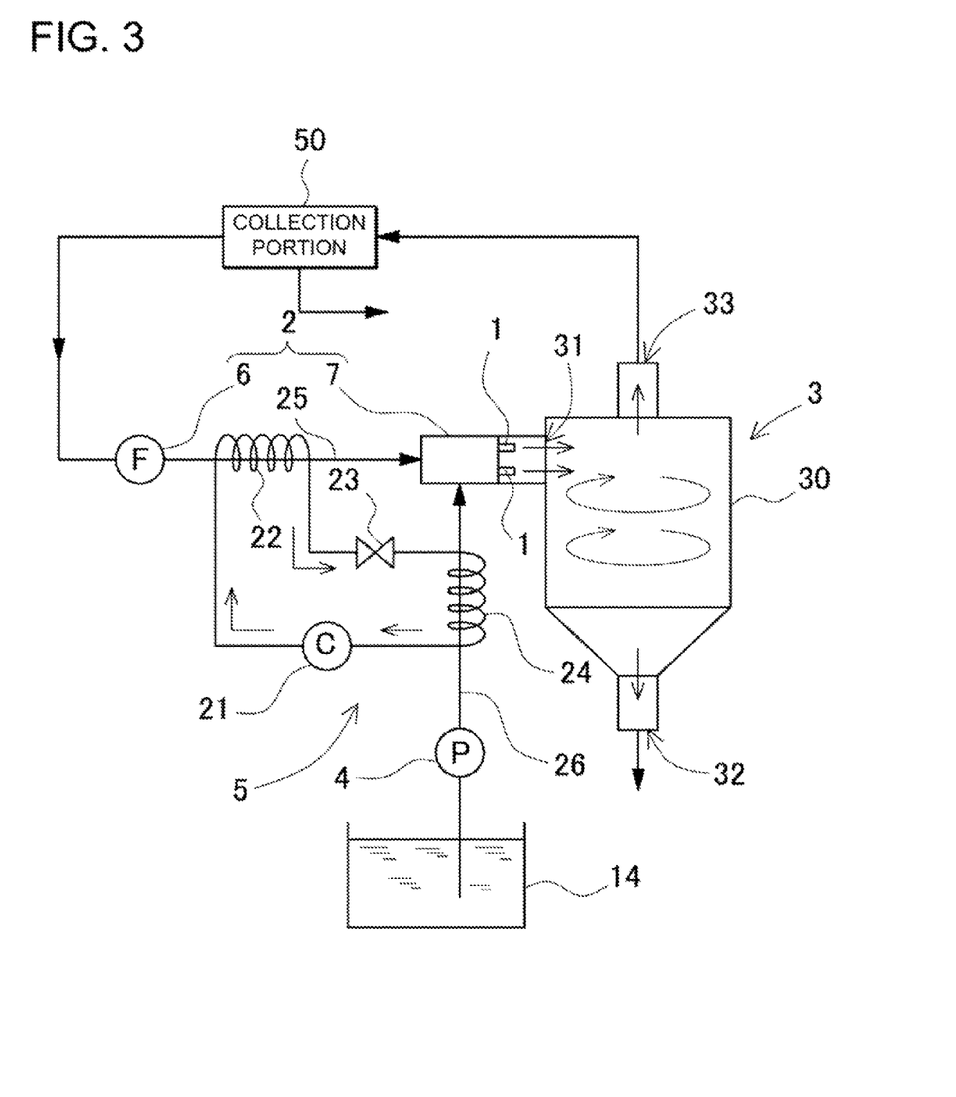
Figure 6:
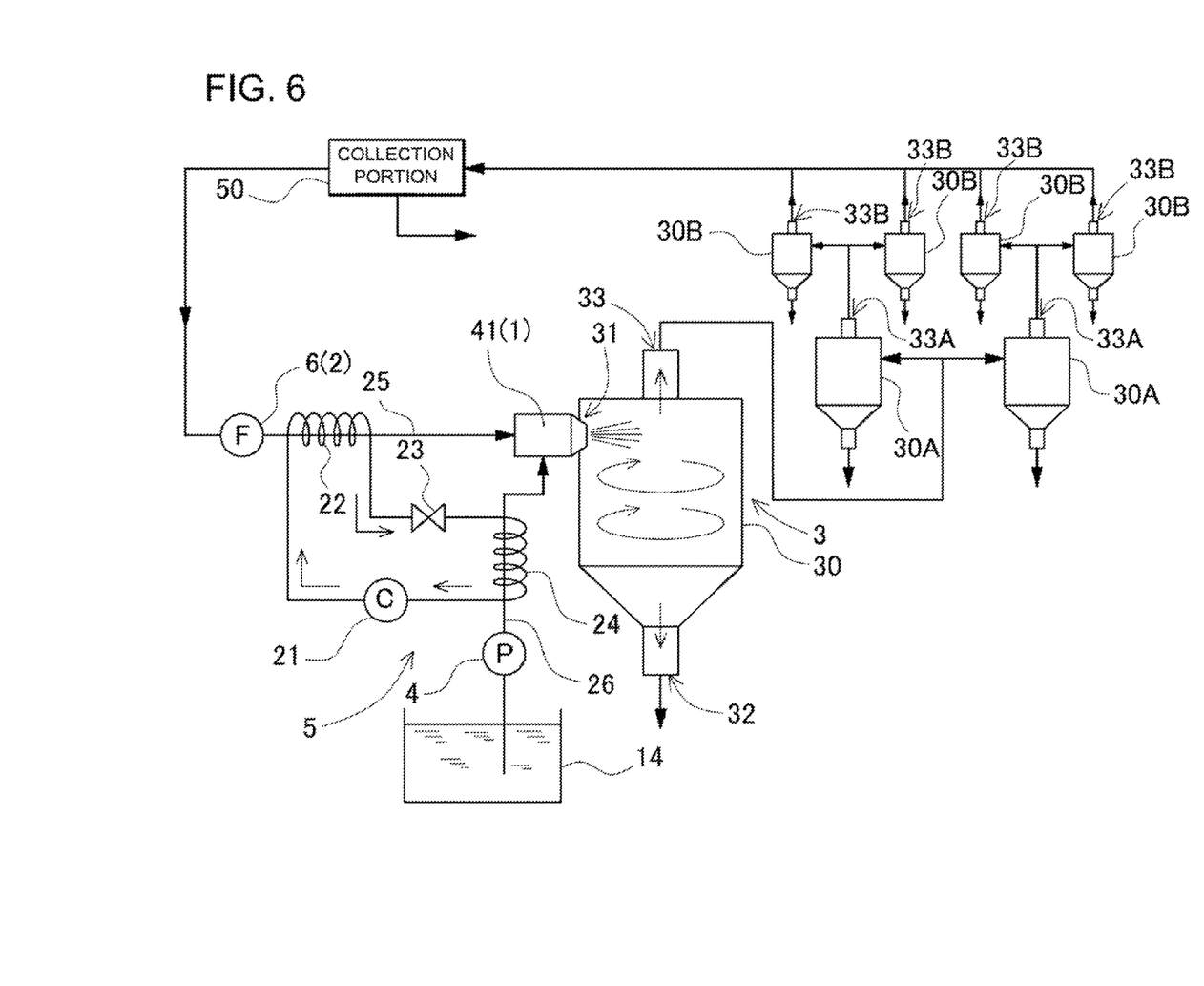
Figure 7:
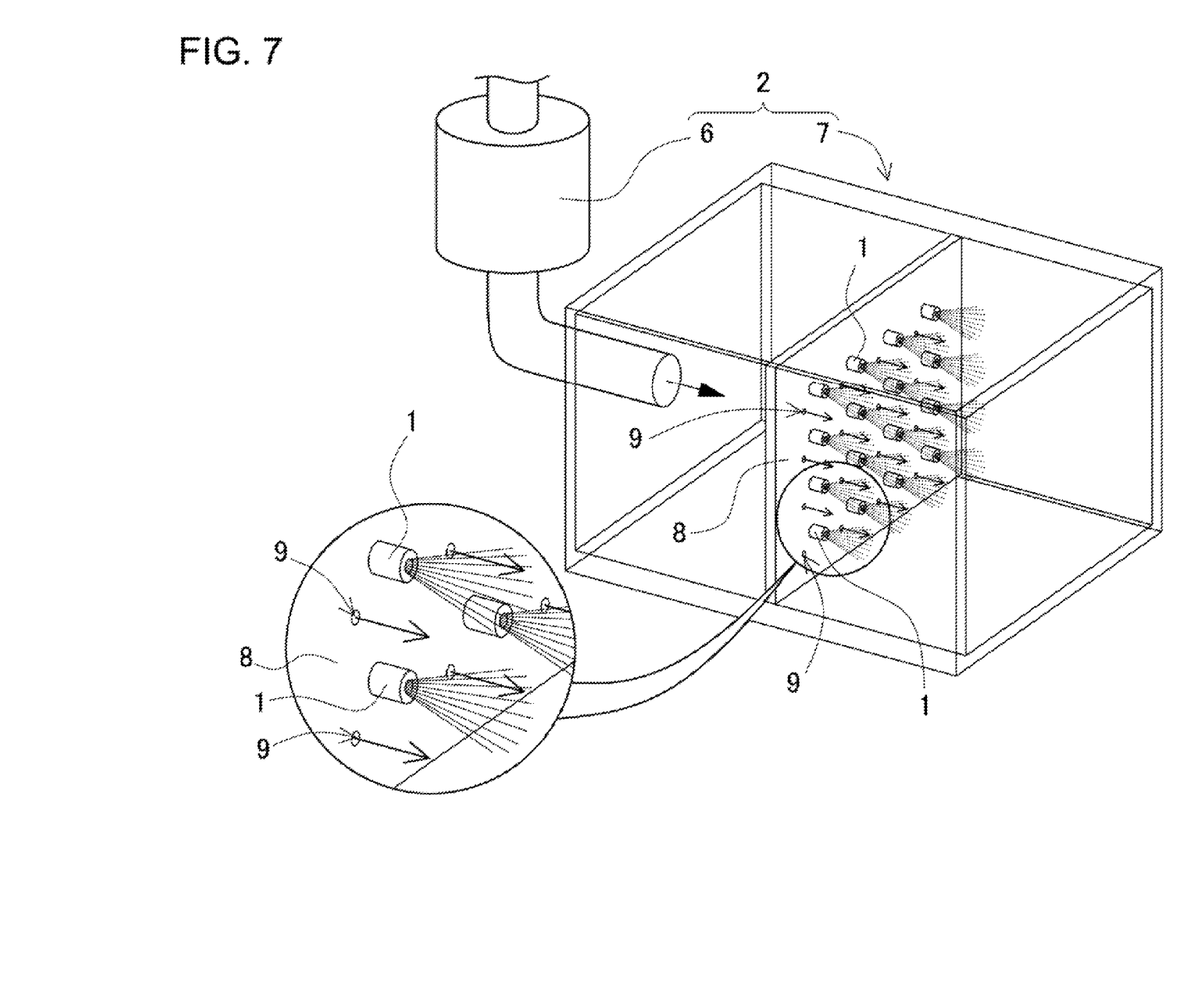
Figure 8:
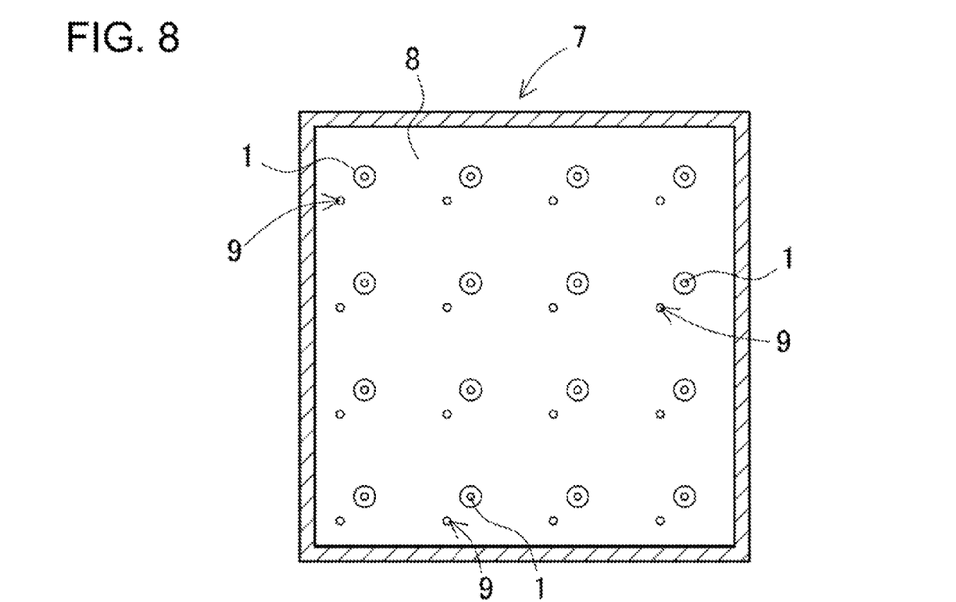
Figure 9:
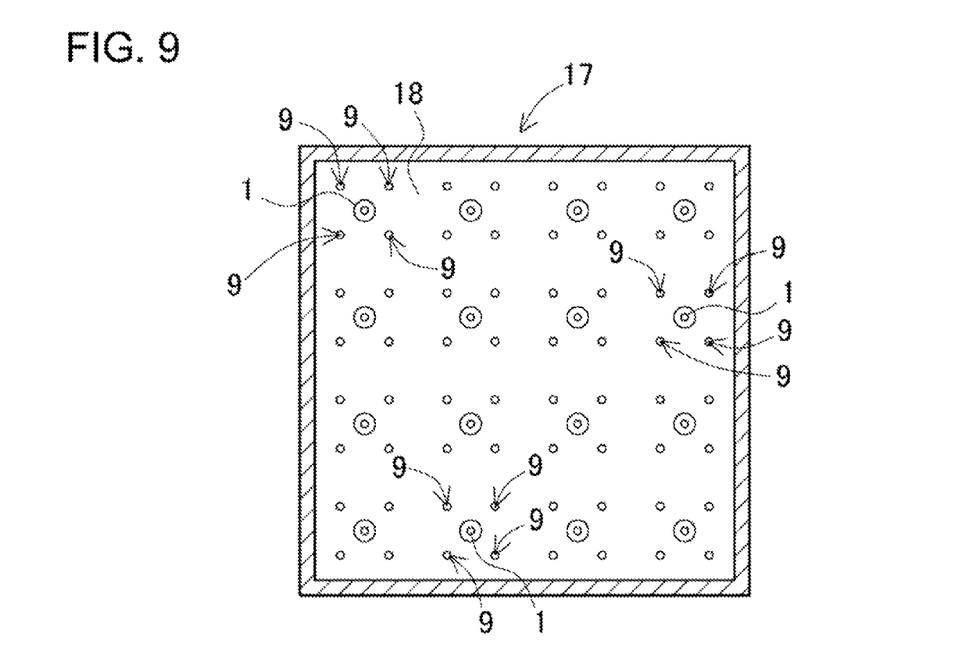
Figure 10:
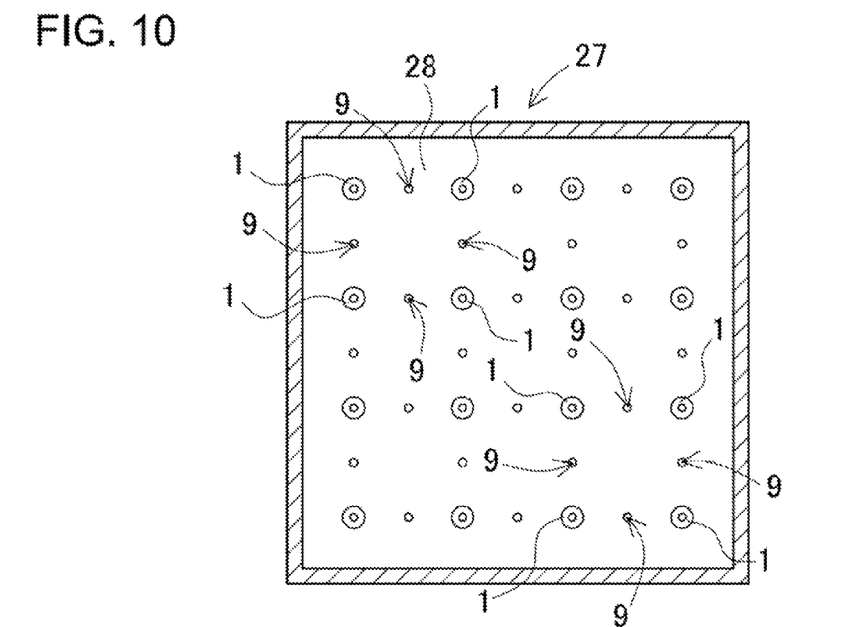
Figure 11:
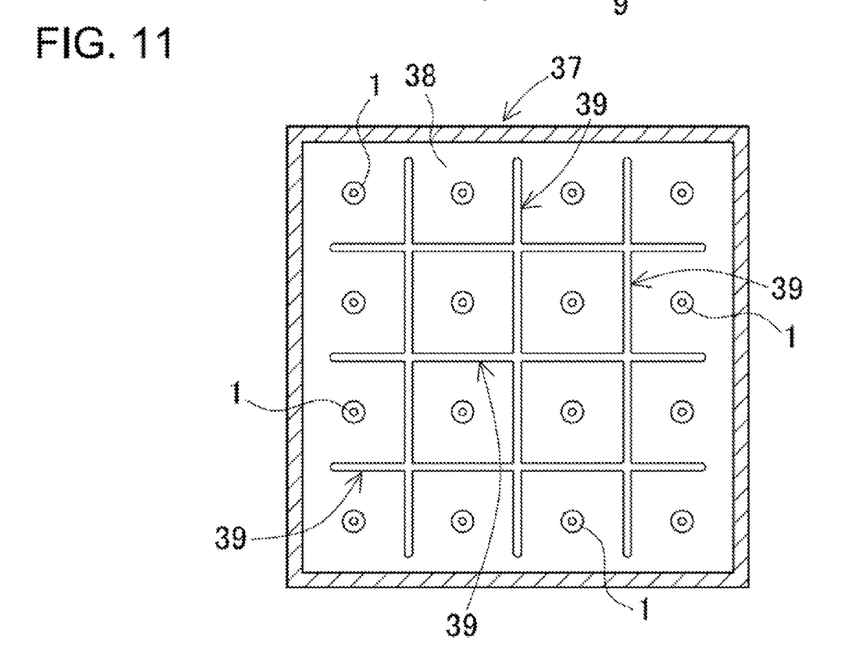
Figure 12:
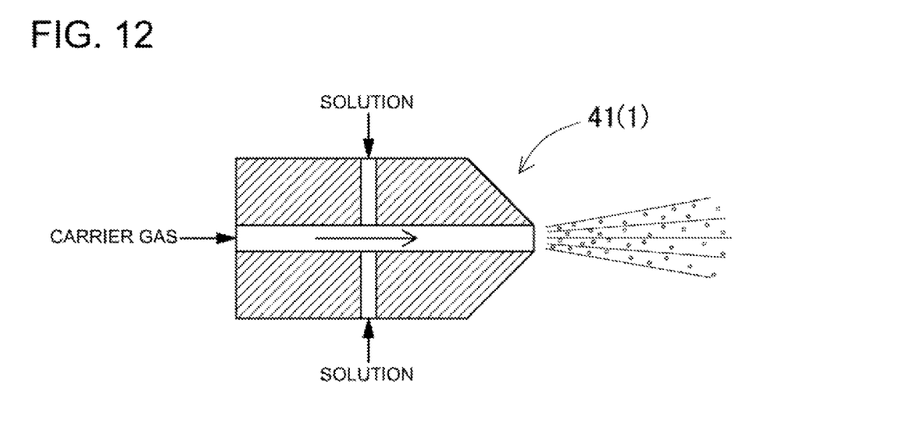

The solutions as indicated above can be concentrated by concentration apparatus as shown in FIG. 3 and FIG. 6. The apparatus for concentrating solution in these figures comprises plural nozzles 1 to spray solution into minute mist, gas supplier 2 to transfer gas-mist mixture flow including mist sprayed from the nozzle 1 by supplying of carrier gas, and separator 3 to separate low boiling point components from high boiling point components by supplying of the gas-mist mixture flow transferred by gas supplier 2. Moreover, apparatus in figures comprises a pump 4 to supply the pressurized solution sprayed from the nozzles 1. And, the apparatuses in FIGS. 3, 5 and 6 also comprise cooling unit 5 to cool and supply the solution sprayed from the nozzles 1. The apparatus with spraying from the nozzles 1 while solution is cooled by cooling unit 5 has a property that concentration of component with low boiling point can be elevated higher. It should be noted that apparatus in this invention as shown in FIG. 4 can be also supply solution into nozzles 1 without cooling unit. Moreover, apparatuses as shown in FIGS. 3, 4, and 6 employ cyclone 30 as separator 3, on the other hand, can be also use demister 40 as separator 3 instead of cyclone as shown in FIG. 5.

Pump 4 is supplying pressurized solution into nozzles 1. In the case that the pressure of solution supply is higher by pump 4, the average mist diameter will be smaller sprayed from the nozzles 1. It should be noted that the average diameter is not varied from only solution pressure by pump but also nozzle structure. From above fact, the pressure into nozzles by pump should be optimized by considering with nozzle structure and mist diameter, the pressure is preferably set more than 0.1 MPa, preferably, more than 0.2 MPa, more preferably, more than 0.3 MPa. If the solution pressure set point into nozzles is higher, pump equipment cost is not only expensive but also the running cost will be elevated by increasing of consumption electric energy. Therefore, the solution pressure set point into nozzles is for example less than 1 MPa, preferably less than 0.8 MPA, more preferably, less than 0.7 MPa. When alcohol water solution or coolant is concentrated, the solution pressure into nozzles is set from 0.3 MPa to 0.6 MPa, preferably.

Nozzles 1 are spraying to minute mist atomization from pressurized solution. Nozzles 1 also make solution form the gas-mist mixture flow by atomizing into carrier gas. This gas-mist mixture flow is supplied into cyclone 30 or demister 40 as separator 3, and separated.

FIG. 7 shows a structure that nozzles 1 spray solution into carrier gas. The carrier gas is supplied into nozzles 1 by gas supplier 2. The gas supplier 2 in FIG. 7 comprises a gas pressurizer 6 to compress and transfer the carrier gas. The gas pressurizer 6 can be a pressured fan, blower, or air pump. The carrier gas transferred from the gas pressurizer 6 is ejected from plural aperture 9 set around nozzles 1. FIG. 7 and FIG. 8 indicates gas-mist mixture 7 to mix between mist sprayed from plural nozzles 1 and carrier gas supplied from each aperture 9 whereby plural apertures 9 to supply carrier gas to plural nozzles are set around each nozzles 1. A chamber plate 8 set within this gas mist mixture 7 separates inlet side and outlet side. The plurality of nozzles 1 are fixed two-dimensionally onto the chamber plate 8. The nozzles 1 are fixed onto the chamber plate 8 as to spray mist toward outlet side. Moreover, the chamber plate 8 is set apertures 9 as penetrated holes around each nozzle 1 to supply the carrier gas to nozzle spraying ranges. As shown in this figure, the structure one aperture 9 is set around one nozzle 1 can be efficiently vaporized low boiling point compounds because mist from each nozzle can be sprayed into fresh carrier gas.

Moreover, as shown in FIG. 9, the structure that plural apertures 9 are set around one nozzle 1 can more efficiently vaporize low boiling point components sprayed from the nozzle 1. Gas mist mixer 17 in FIG. 9 is set 4 apertures as penetrated holes at even intervals around each nozzle 1 while plural nozzles 1 are fixed two dimensionally onto a chamber plate 18. Fresh air or carrier gas ejected from apertures 9 makes low boiling point components in mist sprayed from a nozzle 1 efficiently vaporize, and it is very important that the fresh air or carrier gas is prevented from saturation by mist sprayed from other nozzles 1. Therefore, the reason why plural nozzles 1 are supplied the carrier gas from plural apertures 9 is because to spray mist from the nozzles 1 into fresh air or carrier gas makes low boiling point components efficiently vaporize. From the above reason, it is not necessarily that plural apertures 9 are set around all nozzles 1, for example as shown in FIG. 10, the apertures 9 are set between adjacent nozzles, the fresh air or carrier gas can be also supplied to each nozzle 1. Gas mist mixer 27 in FIG. 10 is set two-dimensionally plural nozzles 1 onto a chamber plate 28, while apertures 9 as penetrated holes are opened between nozzles 1.

Moreover, it is not necessarily that plural apertures are set around one nozzle 1. FIG. 11 shows that plural nozzles 1 are spraying mist into carrier gas supplied from apertures 39 with a slit shape whereby apertures 9 with a slit shape to supply carrier gas are set around each nozzle 1. FIG. 11 shows that the apertures 39 with the slit shape are opened on chamber plate 38 between adjacent nozzles 1. This gas mist mixer 37 has apertures 39 with the slit shape opened on the chamber plate 38 that is fixed on plural nozzles 1. One aperture 39 can supply fresh air or carrier gas to plural nozzles 1 because the aperture has an elongated shape. Therefore, one aperture 39 can supply fresh air or carrier gas to plural nozzles 1. On the other hand, the structure with two-dimensionally arraying plural nozzles can supply fresh air or carrier gas to each nozzle 1 whereby one or plural lines of apertures 39 with the slit shape are set between adjacent nozzles 1.

Additionally, carrying out example as shown in FIG. 6 uses two-fluid nozzle 41 as nozzle 1 that ejects both solution and carrier gas. Two-fluid nozzle 41 is spraying solution supplied from pump 4 into mist by carrier gas supplied from the gas pressurizer 6. It is not necessarily that two-fluid nozzle 41 should be supplied solution under positive pressure condition, only the carrier gas can atomize solution into mist.

Two-fluid nozzle 41 shown in cross sectional FIG. 12 sprays the supplied solution into mist by carrier gas. Since two-fluid nozzle 41 sprays solution into mist by carrier gas, low boiling point components can be efficiently vaporized into carrier gas. It is not always necessary that concentrating apparatus using two-fluid nozzle 41 as nozzle 1 has plural nozzle. It should be noted that it can improve the performance by spraying mist from plural two-fluid nozzles.

The apparatus for concentrating solution shown in above figures cyclically uses carrier gas. Apparatus for concentrating solution with this cyclical structure uses hydrogen, helium, and nitrogen as carrier gas. Preferably, concentrating apparatus uses hydrogen or helium. While, as carrier gas, hydrogen and helium mixture gas, hydrogen and air mixture gas, helium and air mixture gas, or/and hydrogen, helium and air mixture gas are also used for concentrating apparatus. Moreover, inert gases can be also used for carrier gas.

The apparatus for concentrating solution with cyclical structure of carrier gas can prevent from leaking out of solution, because carrier gases are not ejected to outside. Additionally, running cost can be decreased by using hydrogen and/or helium for carrier gas. It should be noted that the apparatus for concentrating solution indicated in this invention is not restricted about these gases as carrier gas in above embodiments, air is also preferable for carrier gas. Air can be used in cyclical structure and non-cyclical structure. In an apparatus for concentrating solution with non-cyclical structure, fresh air is vacuumed by gas supplier and supplied around nozzles.

Cooling units as shown in FIGS. 3, 5 and 6 cool solution supplied to nozzles 1. Moreover, cooling units 5 in figures are heating the carrier gas by thermal energy for cooling. Cooling units as shown in FIGS. 3, 5 and 6 are cooling or heating heat exchangers by latent heat and condensation heat of coolant. This cooling unit 5 comprises compressor 21 to compress vaporized coolant, heating heat exchanger 22 to liquefy the vaporized coolant by radiation of heat of coolant, expansion valve 23 to adiabatic expand the coolant liquefied at heating heat exchanger 22, and cooling heat exchanger 24 to evaporate the coolant supplied from expansion valve 23 within itself and simultaneously to cool solution in outside by vaporization heat.

The apparatuses for concentrating solution in FIGS. 3 and 6 are cooling solution via solution duct 26 by cooling heat exchanger 24 wherein cooling heat exchanger 24 is thermally connected to solution duct 26 of solution. This structure can quickly cool solution by cooling heat exchanger 24. Additionally, concentrating apparatus as shown in FIG. 5 set cooling heat exchanger 24 to solution tank 14 to reserve solution vacuumed by pump 4. This cooling unit 5 is cooling the solution in solution tank 14 setting cooling heat exchanger 24. The above cooling heat exchanger 24 is cooling solution, for example from 0 degree Celsius to 20 degree Celsius that the temperature is solution isn't solidified. By cooling the solution, the concentration of component ejected from upward of cyclone 30 can be elevated. Therefore, for example, in concentrating apparatus for alcohol water solution, the decrease of temperature in solution can elevate the concentration of alcohol ejected from upward of cyclone 30. Additionally, in the case of anti-freezing solution containing freezing point depressant, the concentration of freezing point depressant in solution from upward of cyclone 30 is decreased, in the other words, the concentration of water in the solution is increased.

Moreover, concentrating apparatuses as shown in FIGS. 3, 5, and 6 are heating carrier gas via duct 25 by heating heat exchanger 22 wherein heating heat exchanger 22 is thermally connected to duct 24 with carrier gas. Carrier gas can elevates the vaporization efficiency of mist sprayed from the nozzles with increasing carrier gas temperature. Because the carrier gas temperature increasing causes increasing of component amount containing in unit carrier gas. Heating heat exchanger 22 is heating carrier gas to 25 to 30 degrees Celsius. It should be noted that heating heat exchanger 22 can also heat carrier gas 15 to 40 degrees Celsius.

Cyclone 30 in separator 3 centrifuges the sprayed mist. Therefore, the carrier gas containing mist is flowed into tangential direction of cyclone 30. The cyclones as shown in FIGS. 3, 4, and 6 comprise inlet 31 of gas and mist, downward outlet 32 to eject the second component centrifugally down around inner wall of the cyclone, and upward outlet 33 to evacuate up the first component gathering to center of cyclone. Cyclone 30 separate the mist flowed from inlet 31 by centrifugation of inner rotating. The centrifugal force against rotating mist in cyclone 30 is different from the mist diameters. The centrifugal force is proportional to the weight of mist. Therefore, the larger mist is transferred around inner wall of cyclone by larger centrifugal force, fallen down around inner wall and ejected from downward outlet 32. On the other hand, the smaller mist and the gases vaporized from mist surface have smaller weight, therefore these are gathered to center of cyclone, and evacuated from upward outlet 33.

Additionally, the demister 40 of separator 3 as shown in FIG. 5 also separate larger mist and smaller mist. The demister makes the carrier gas including mist pass, simultaneously the larger mist impact to the demister and coagulate to larger droplets. The demister makes the smaller diameter mist and the gases from mist surface pass, and evacuates separately from upward of the demister.

As the separator 3, except for cyclone and demister, every means, for example some adsorbents, can be also useful for separation of mist using the deference of diameter or weight of gas-mist mixture.

Therefore, when anti-freezing solution containing freezing point depressant like ethylene glycol is sprayed into mist by nozzle 1 and supplied to cyclone 30 by carrier gas, water in mist is vaporized into carrier gas and ejected from upward outlet 33 of cyclone, and freezing point depressant like ethylene glycol which has higher boiling point than that of water is evacuated from downward outlet 32 with mist state, because water is easier vaporized than freezing point depressant like ethylene glycol. Therefore, in the first component ejected from upward outlet 33, the concentration of freezing point depressant is low, while in the second component evacuated from downward outlet 32, the concentration of freezing point depressant is high. The carrier gas can be separated from water and freezing point depressant by putting with bubble the first ejected component into water bulk. The carrier gas separated from water and freezing point depressant can be recirculated to cyclone 30 again. Since the concentration of freezing point depressant is high in the second evacuated component from downward outlet 32, the concentration of freezing point depressant can be elevated by recirculation this second component into solution tank 16. The apparatus for concentrating solution as shown in FIG. 4 has water tank 15 to put the first ejected component with bobble. The freezing point depressant and water are removed from carrier gas by putting the first ejected component into this water tank 15. The carrier gas removed freezing point depressant and water in water tank 15 is recirculated into cyclone 30 from the nozzle 1 by compressor or blower etc. as the gas pressurizer 6. The apparatus for concentrating solution as shown in FIG. 4 is more suitable for concentration of freezing, point depressant than water, because freezing point depressant is more difficult to be vaporized that water.

The apparatus for concentrating solute that is easier to be vaporized than solvent, for example alcohol water solution, can concentrate alcohol whereby the alcohol in the carrier gas ejected from upward outlet 33 of cyclone 30 is coagulated and separated. When the alcohol water solution is sprayed into mist and supplied into cyclone 30, the alcohol containing in mist is vaporized into the carrier gas and ejected from upward outlet 33. Water that is not vaporized is evacuated from downward outlet 32 as mist state. Therefore, concentrated alcohol can be obtained from the first ejected component from upward outlet 33.

Figure 5:
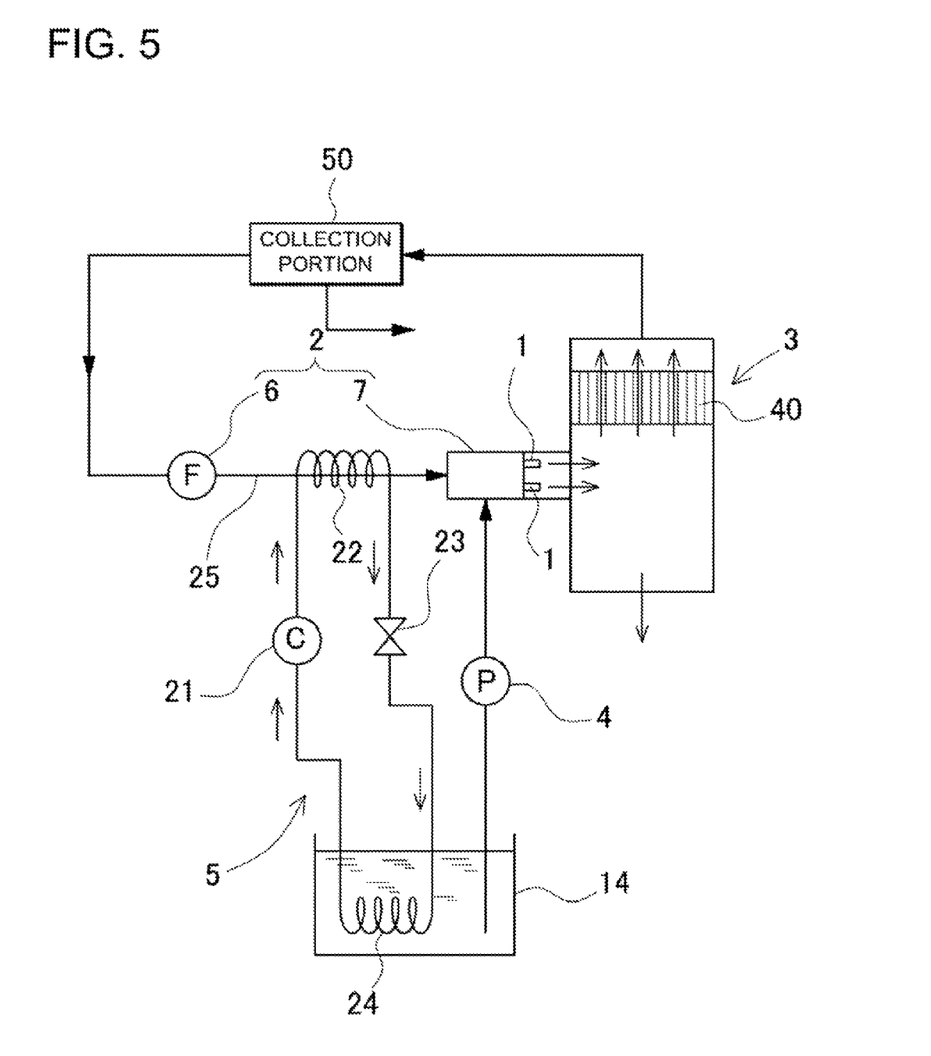

The apparatuses for concentrating solution that is easier to be vaporized that water solvent like alcohol etc. are shown in FIGS. 3, 5 and 6. These apparatuses for concentrating solution have collection portion 50 to collect the first ejected component from upward outlet 33 of cyclone 30 or upward of demister 40. The collection portion 50 collects the first ejected component by coagulation and separates from carrier gas. Therefore, this collection portion is possible all structures that can collect and make low boiling point component as the first ejected component coagulate. The structure is both that has already developed and will be developed. For example, an embodiment of correction portion is collector to coagulate the component like alcohol etc. contained in carrier gas by cooling, or other embodiment is collector to adsorb the component like alcohol etc. contained in carrier gas onto adsorbent.

Collection portion to collect alcohol by cooling carrier gas with alcohol has cooling heat exchanger to coagulate alcohol by cooling carrier gas with alcohol as not shown. This cooling heat exchanger can cool the carrier gas by recirculating coolant or cooling water into heat exchanging pipes. The cooling heat exchanger is more efficient if the heat exchanging pipes are attached fins. This collection portion can collect alcohol component contained in carrier gas as solution.

Collection portion to collect alcohol by adsorbing onto adsorbent can collects whereby alcohol adsorbed onto adsorbent is desorbed by heated collection gas and alcohol is coagulated and separated from collection gas containing desorbed alcohol by cooling as not shown. An embodiment of this collection portion comprises rotor set with adsorbent in its void and rotating mechanism for the rotor. The rotor is honeycomb rotor with void that makes carrier gas pass through direction of rotating shaft. As adsorbent, for example, one of or mixture of zeolite, activated carbon, lithia, and silica gel is available. By this collection portion makes rotor rotate at appropriate speed by rotating mechanism, the rotor can be shifted from adsorbing area to adsorb alcohol to desorbing area to collect desorbed alcohol. When rotor is shifted to adsorbing area, alcohol containing in carrier gas is adsorbed onto adsorbent by passing carrier gas with alcohol through the void with adsorbent. When rotor is shifted to desorbing area by rotation, the adsorbed alcohol is desorbed. The desorbed alcohol is collected by cooling collection gas containing alcohol vapor. The carrier gas through adsorbing area of rotor is recirculated to gas supplier.

Moreover, the apparatus for concentrating solution as shown in FIG. 6 elevates the alcohol concentration whereby the first ejected component from upward outlet 33 of cyclone 30 as separator 3 is supplied into second plural cyclones. Particularly, the apparatus in FIG. 6 has a structure to collect higher concentration alcohol by repeating above process. The apparatus for concentrating solution in FIG. 6 is supplying the first ejected component from upward outlet 33 of cyclone 30 supplied from the nozzle 1 into plural second cyclones 30A. Number of this second cyclone 30A is increased from number of cyclone 30 supplied mist from the nozzle 1, and the flow volume to a second cyclone is decreased from flow volume to a cyclone 30. Therefore, this second cyclone 30A is adopted smaller volume one than cyclone 30 supplied mist from the nozzle 1. The first ejected component from the first cyclone 30 is supplied into the second cyclone 30A, centrifuged at each second cyclone 30A, and ejected as the second ejected component from upward outlet 33A of second cyclone 30A. Moreover, the apparatus for concentrating solution in Figure is supplying the second ejected component from upward outlet 33A of second cyclone 30A into plural third cyclones 30B. Number of the third cyclone 30B is increased from number of second cyclone 30A, and the flow volume to a third cyclone is decreased from flow volume to a second cyclone. Therefore, this third cyclone 30B is adopted smaller volume one than second cyclone 30A. The second ejected component from the second cyclone 30A is supplied into the third cyclone 30B, centrifuged at each third cyclone 30B, and ejected as the third ejected component from upward outlet 33B of third cyclone 30B. As described above, the alcohol concentration in ejected component is elevated by repeating separation of ejected component from upward outlet of cyclone. Particularly, the apparatus for concentrating solution has a separation feature that the concentration of alcohol is higher because the volumes of carrier gas supplied to each cyclone are less as repeating plural process of the first cyclone 30 separation process, the second cyclone 30A separation process, and the third cyclone 30B separation process.

Figure 4:
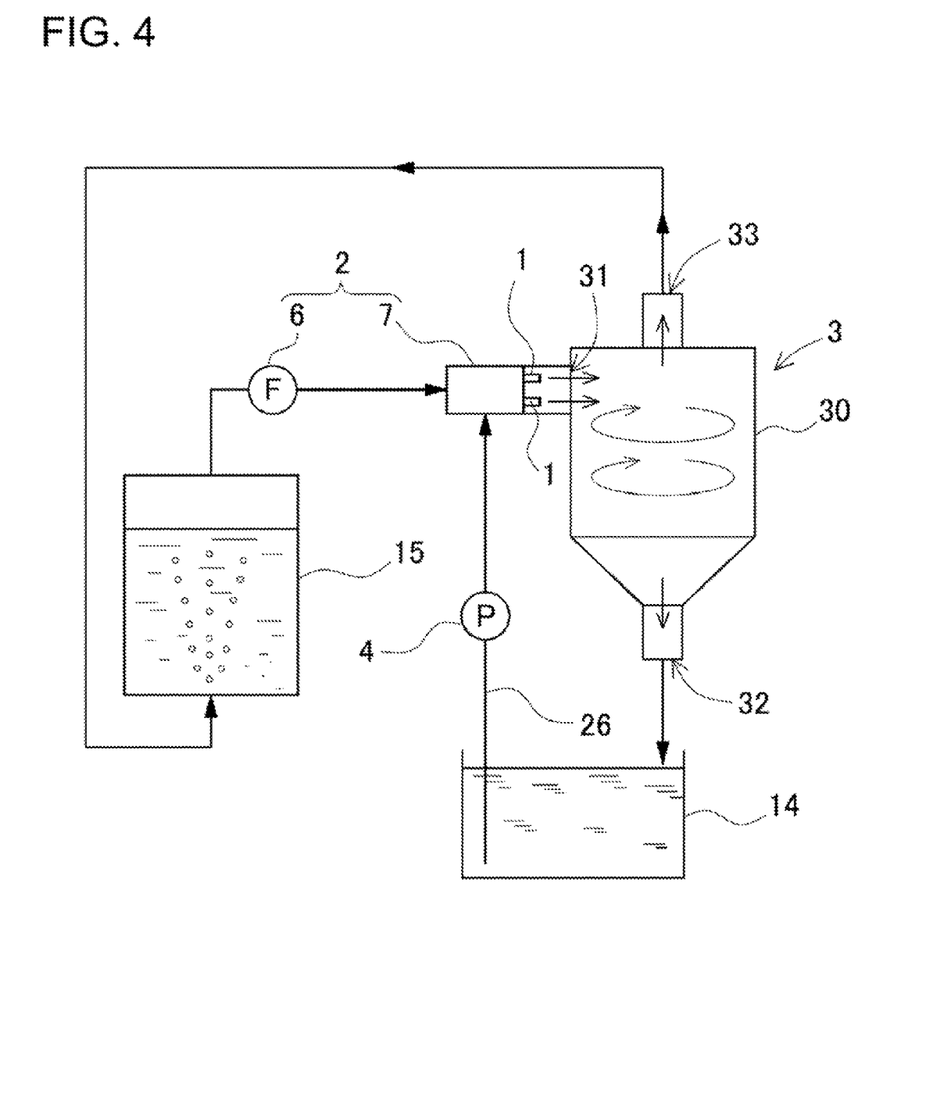
Figure 13:
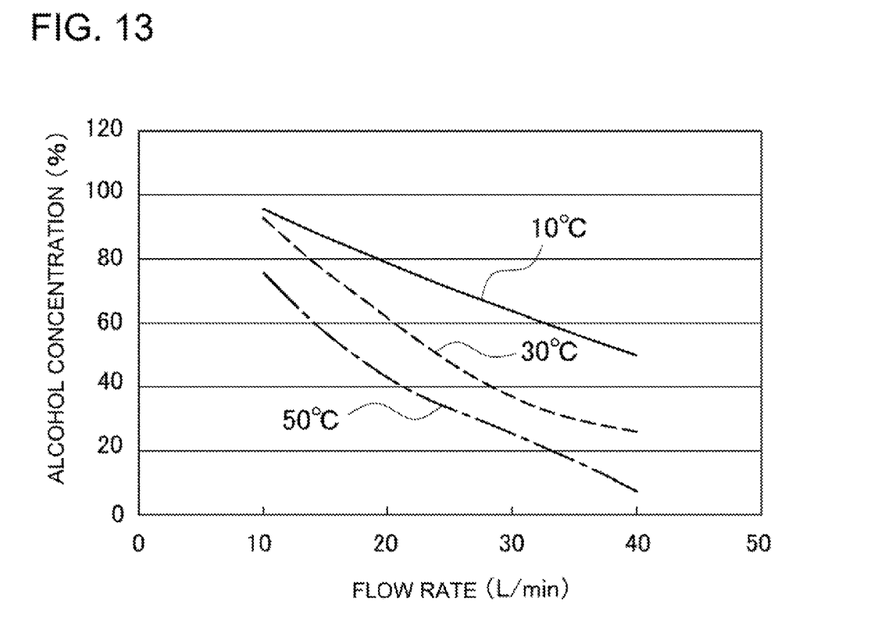

FIG. 13 shows the relationship between flow rate of gas-mist mixture and alcohol concentration in ejected gas against each temperature of 10% alcohol water solution supplied to apparatus. As shown in FIG. 13, in the case of lower temperature in alcohol solution, the concentration of alcohol in ejected, gas is higher. From this result, to cool solution supplied into nozzle 1 is effective to separate alcohol as shown in FIGS. 3, 4, and 6. Additionally, as shown in figures, it indicates that the alcohol concentration in ejected gas is higher as the flow rate of gas-mist mixture is smaller. Therefore, as the apparatus for concentrating solution shown in FIG. 6, alcohol concentration in ejected gas can be elevated by repeating separation processes by plural cyclones and less flow rate of gas-mist mixture.

INDUSTRIAL APPLICABILITY

In the presented invention, the apparatus for concentrating solution can efficiently concentrate and separate solution by utilization of separation phenomenon low boiling point component from high boiling point component solution is sprayed into mist according to spray solution from the nozzles, while both the equipment cost and the running cost are simultaneously reduced by simple spraying and gas supplying method/structure.

DENOTATION OF REFERENCE NUMERALS

1: nozzle
2: gas supplier
3: separator
4: pump
5: cooling unit
6: gas pressurizer
7: gas mist mixer
8: chamber plate
9: aperture
14: solution tank 15: water tank
17: gas mist mixer
18: chamber plate
21: compressor
22: heating heat exchanger
23: expansion valve
24: cooling heat exchanger
25: duct
26: solution duct
27: gas mist mixer
28: chamber plate
30: cyclone; 30A: second cyclone; 30B: third cyclone
31: inlet
32: downward outlet
33: upward outlet; 33A: upward outlet; 33B: upward outlet
37: gas mist mixer
38: chamber plate
39: aperture
40: demister
41: two fluid nozzle
50: collection portion
91: ultrasonic atomization chamber
92: vaporizer
93: condenser
94: cooling heat exchanger
95: heating heat exchanger
96: nozzle

The invention claimed is:

1. An apparatus for concentrating solution comprising:
a plurality of nozzles configured to spray a solution as mist;
a gas supplier configured to supply a carrier gas into the sprayed mist and to transfer the mist as a gas-mist mixture; and
a separator configured to separate the gas-mist mixture, which is transferred by the gas supplier, into a low boiling point component and a high boiling point component,
wherein the gas supplier comprises a gas mist mixer where the mist sprayed from the plurality of nozzles is mixed with the carrier gas supplied from the gas supplier to generate the gas-mist mixture including the low boiling point component as a vaporized low boiling point component,
wherein the gas supplier comprises at least one aperture from which the carrier gas is emitted into a single continuous space inside the gas mist mixer,
wherein the plurality of nozzles is fixed on the gas mist mixer so that outlets of the plurality of nozzles open into the single continuous space inside the gas mist mixer such that each of the plurality of nozzles emits the mist into the single continuous space,
wherein the gas supplier is configured so that the carrier gas is blown in a direction that is substantially the same as a direction in which the plurality of nozzles emit the mist, and the gas supplier is configured to transfer the gas-mist mixture including the vaporized low boiling point component to the separator by the carrier gas supplied through the at least one aperture, and
wherein the aperture is positioned between the nozzles, and the mist is emitted and the carrier gas is blown in directions that are substantially parallel.

2. The apparatus for concentrating solution recited in claim 1, wherein the at least one aperture comprises a plurality of apertures configured to supply the carrier gas to each of the plurality of nozzles.

3. The apparatus for concentrating solution recited in claim 2, wherein the gas supplier comprises a gas pressurizer configured to flow the carrier gas in a compressed state, and the carrier gas flowed from the gas pressurizer is ejected from the plurality of apertures set around each of the plurality of nozzles.

4. The apparatus for concentrating solution recited in claim 1, wherein the at least one aperture comprises a plurality of apertures positioned around the plurality of nozzles.

5. The apparatus for concentrating solution recited in claim 1, wherein the gas mist mixer comprises a chamber plate inside the gas mist mixer, the chamber plate separating the gas mist mixer into an inlet side space and an outlet side space, and wherein the plurality of nozzles is fixed on the chamber plate so that the outlets of the plurality of nozzles open into the outlet side space to spray the mist toward the outlet side space.

6. The apparatus for concentrating solution recited in claim 5, wherein the at least one aperture is formed so as to penetrate through the chamber plate, the at least one aperture being located around each of the plurality of nozzles to supply the carrier gas to each of the plurality of nozzles.

7. The apparatus for concentrating solution recited in claim 6, wherein the at least one aperture comprises a plurality of apertures, and wherein each of the plurality of nozzles is allocated in position with a corresponding one of the plurality of apertures.

8. The apparatus for concentrating solution recited in claim 6, wherein the at least one aperture comprises a plurality of apertures positioned around a first nozzle of the plurality of nozzles.

9. The apparatus for concentrating solution recited in claim 5, wherein the plurality of nozzles is fixed on the chamber plate such that the outlets of the plurality of nozzles are arranged in a matrix.

10. The apparatus for concentrating solution recited in claim 1, wherein each of the at least one aperture is set between adjacent ones of the plurality of nozzles.

11. The apparatus for concentrating solution recited in claim 1, wherein the at least one aperture has a slit shape, and wherein the plurality of nozzles are configured to spray the mist into the carrier gas supplied from the gas supplier via the at least one aperture having the slit shape.

12. The apparatus for concentrating solution recited in claim 11, wherein the at least one aperture having the slit shape is formed between adjacent ones of the plurality of nozzles.

13. The apparatus for concentrating solution recited in claim 11, wherein the gas mist mixer comprises a chamber plate inside the gas mist mixer, the chamber plate separating the gas mist mixer into an inlet side space and an outlet side space, wherein the plurality of nozzles is fixed on the chamber plate so that the outlets of the plurality of nozzles open into the outlet side space to spray the mist toward the outlet side space, and wherein the at least one aperture having the slit shape is formed so as to penetrate the chamber plate.

14. The apparatus for concentrating solution recited in claim 13, wherein the at least one aperture having the slit shape is formed in one line or plural lines between adjacent ones of the plurality of nozzles.

15. The apparatus for concentrating solution recited in claim 1, wherein the plurality of nozzles is configured to spray the solution as the mist with the solution being supplied from a pump, each of the plurality of nozzles being configured to spray both the solution and the carrier gas at one time to generate the gas-mist mixture including the vaporized low boiling point component.

16. The apparatus for concentrating solution recited in claim 15,
wherein the gas supplier comprises a gas pressurizer configured to flow the carrier gas in a compressed state, and
wherein each of the plurality of nozzles is configured to spray the solution as the mist with the solution being atomized into the mist by being exposed to the carrier gas in the compressed state that is supplied from the gas pressurizer.

17. The apparatus for concentrating solution recited in claim 15, wherein each of the plurality of nozzles is configured to spray the solution as the mist with the solution being atomized into the mist by being exposed to the carrier gas in an uncompressed state.

18. The apparatus for concentrating solution recited in claim 1, wherein the separator is a cyclone, and
wherein the cyclone is configured to separate and concentrate the low boiling point component contained in the carrier gas, the low boiling point component being ejected from an upward outlet of the cyclone.

19. The apparatus for concentrating solution recited in claim 1, wherein the separator is a demister, and
wherein the demister is configured to separate and concentrate the low boiling point component contained in the carrier gas.

20. The apparatus for concentrating solution recited in claim 1, wherein the plurality of nozzles is configured to atomize the solution into the mist.

21. The apparatus for concentrating solution recited in claim 20, wherein the gas supplier is configured to supply the carrier gas as carrier gas heated by thermal energy which is generated when the solution is cooled.

22. The apparatus for concentrating solution recited in claim 1, wherein the solution is alcoholic aqueous solution, anti-freezing solution, or petroleum.

23. The apparatus for concentrating solution recited in claim 1, wherein the carrier gas contains hydrogen, argon, or methane.

24. The apparatus for concentrating solution recited in claim 18, wherein the solution contains anti-freezing solution with water and freezing point depressant, wherein the cyclone is configured to upwardly discharge a first component in the gas-mist mixture, the first component being bubbled in water so that the freezing point depressant in the first component is dissolved in the water to be removed, and
wherein the cyclone is configured to downwardly discharge a second component in the gas-mist mixture, the second component being circulated into the solution to increase a concentration of the anti-freezing solution in the solution.

25. The apparatus for concentrating solution recited in claim 18, wherein the solution is alcoholic aqueous solution, and wherein the cyclone is configured to upwardly discharge a first component in the gas-mist mixture, the first component being coagulated, separated, and collected as concentrated alcohol.

26. The apparatus for concentrating solution recited in claim 5, further comprising a gas pressurizer configured to flow the carrier gas in a compressed state through the gas mist mixer, wherein the gas pressurizer has an outlet connected to the inlet side space of the gas mist mixer.

27. The apparatus for concentrating solution recited in claim 13, wherein the at least one aperture having the slit shape comprises a first aperture continuously formed in a grid pattern on the chamber plate so that the first aperture divides the plurality of nozzles respectively in position.

28. An apparatus for concentrating solution comprising:

a plurality of nozzles configured to spray a solution as mist;

a gas supplier configured to supply a carrier gas into the sprayed mist and to transfer the mist as a gas-mist mixture; and a separator configured to separate the gas-mist mixture, which is transferred by the gas supplier, into a low boiling point component and a high boiling point component, wherein the gas supplier comprises a gas mist mixer where the mist sprayed from the plurality of nozzles is mixed with the carrier gas supplied from the gas supplier to generate the gas-mist mixture including the low boiling point component as a vaporized low boiling point component, wherein the gas supplier comprises at least one aperture from which the carrier gas is emitted into a single continuous space inside the gas mist mixer, wherein the plurality of nozzles is fixed on the gas mist mixer so that outlets of the plurality of nozzles open into the single continuous space inside the gas mist mixer such that each of the plurality of nozzles emits the mist into the single continuous space, wherein the gas supplier is configured so that the carrier gas is blown in a direction that is substantially the same as a direction in which the plurality of nozzles emit the mist, and the gas supplier is configured to transfer the gas-mist mixture including the vaporized low boiling point component to the separator by the carrier gas supplied through the at least one aperture, wherein the at least one aperture has a slit shape, and wherein the plurality of nozzles are configured to spray the mist into the carrier gas supplied from the gas supplier via the at least one aperture having the slit shape, wherein the gas mist mixer comprises a chamber plate inside the gas mist mixer, the chamber plate separating the gas mist mixer into an inlet side space and an outlet side space, wherein the plurality of nozzles is fixed on the chamber plate so that the outlets of the plurality of nozzles open into the outlet side space to spray the mist toward the outlet side space, wherein the at least one aperture having the slit shape is formed so as to penetrate the chamber plate, and wherein the at least one aperture comprises a plurality of elongated linear apertures, each of the apertures extend between adjacent nozzles.

* * * * *